(12) United States Patent
Cope

(10) Patent No.: X8778
(45) Date of Patent: Apr. 22, 1835

(54) STRAW CUTTER

(76) Inventor: John W. Cope

John W. Cope Franklin Tenn.

Letters Patent

The schedule referred to in these Letters Patent and making part of the
same containing a description in the words of the said John W. Cope himself of
his improvement in the straw cutting machine

---

To all to whom these presents shall come. Be it known that I
John W. Cope of the county of Franklin and State of Tennessee, have in-
vented a new and useful improvement in the straw cutting machine, and
that the following is a full and exact description of the construction and ope-
ration of his said machine as invented by me. The frame is constructed of
timbers seven feet three inches in length. four by six inches in width and
thickness and supported by four legs of timber of the same size. This frame is
three feet high and twenty two inches wide from outside to out side and four
teen inches in the clear; This frame is confined together by a piece of timber of
the same size let on tenons cut on the side pieces of the frame by mortices in each
end of this end piece and at the other end by a piece of timber four inches square
and extends through each side piece by tenons; At one end of this frame is fix-
ed upon each rail cap pieces two feet four inches long. four by six inches, these
caps are confined to each rail of the frame by two iron or wooden bolts. these
caps and the side pieces of the frame are rabbited for three feet three inches one
one inch on each of the side rails and an inch in each of the caps. this
forms a groove for a frame upon which the knife is placed, this groove extends
to the end of the frame; In this groove is placed a frame two feet four inches
in length and sixteen inches in width, constructed of timbers two inches
square. The knife which is placed upon this frame is two and a quarter
inches wide, half an inch thick at the centre. the upper side is to be
perfectly true [illegible] from the centre on the under side each way to an edge.
This knife is placed across the centre of this frame obliquely at an angle of for-
ty five degrees and is fastened at each to the frame by iron bolts or wood
screws. The knife may be made as above described with a back in the cen-
tre from end to end one fourth of an inch thick, this knife is to be from the face
to the back, three fourths of an inch thick, the object of this back is to keep the
stop board clean - and is to be made of good steel - On the centre of this frame
and being the centre of the cap pieces, is placed a hopper made of inch plank
four by twelve inches in the clear for twelve inches and for the remaining twelve
inches the hopper being two feet in length is widened to six or eight inches
at top the rear edge being left open. This hopper is confined to the cap pieces
by keys that extend through the cap pieces and are let into each side of the hop
per by groves the mortices in the cap pieces being half an inch wider than the
keys which are confined by two wedges at each end of these keys above and
below, the object of these wedges is to regulate the hopper too or from the
knife. This hopper is to be faced with a steel one inch wide and the
eighth of an inch thick at the lower end of the inside. Immediately
under the hopper is [the stop board] four and a half inches wide and twelve
inches long beveled on the face from the centre each way so as to make it one
eighth of an inch higher in the rider than the other edges. This board is rais-
ed or taken from the knife by means of a screw which passes through the
centre of the cross piece under the hopper which holds the frame of the
machine together by means of which the straw may be cut any length
deemed necessary. Under the hopper [this part of the patent obliterated] board exten
ding from near the wheel to the floor under the hopper fourteen inches wide and
about two feet long. this may be called the apron and the object of which is
to throw the straw as it is cut into a place at the opposite end of the frame;
a wheel of heavy wood four feet in diameter four or five inches thick. this
wheel is placed on the inside of the frame. This wheel is turned by means of a
crank resting in the frame at each end and passing through the centre
of the wheel, which is to run as near the back side of the frame as possible.
The crank is to be eight inches in length and three in width. and then
to extend on the outside of the frame to where a handle is affixed; the crank
is to be made of iron bar one inch square & the gudgeons to be confined on
the frame by small strips of wood fastened with wood screws. The wheel
being in the back side of the frame the crank is thrown in the centre to which is affixed
a pitman of [this part obliterated in the parchment] which is attached by a kind of hinges to the centres of the knife frame.
This may be denominated a horizontal straw cutting machine. The knife
having two edges cut both ways at every revolution of the wheel the straw
having sufficient weight to press it down against the stop board.

Witnesses
James Robinson
John Goodwin

John W. Cope.

Ex^d.
Ch. W.

(10,850 words)

( Rec^d. 1st June 1837 & Recorded anew )